(12) United States Patent
Thies et al.

(10) Patent No.: US 10,220,362 B2
(45) Date of Patent: Mar. 5, 2019

(54) MIXING VESSEL FOR A FOOD PROCESSOR

(71) Applicant: Vorwerk & Co. Interholding GmbH, Wuppertal (DE)

(72) Inventors: Felix Thies, Wuppertal (DE); Jan Von Der Heyden, Hueckeswagen (DE); Reiner Emmermacher, Hamm (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 15/546,804

(22) PCT Filed: Jan. 13, 2016

(86) PCT No.: PCT/EP2016/050535
§ 371 (c)(1),
(2) Date: Jul. 27, 2017

(87) PCT Pub. No.: WO2016/120067
PCT Pub. Date: Aug. 4, 2016

(65) Prior Publication Data
US 2017/0368519 A1 Dec. 28, 2017

(30) Foreign Application Priority Data
Jan. 28, 2015 (DE) .................. 10 2015 101 250

(51) Int. Cl.
*A47J 43/07* (2006.01)
*B01F 15/00* (2006.01)
(Continued)

(52) U.S. Cl.
CPC ..... *B01F 15/00045* (2013.01); *A47J 43/0716* (2013.01); *B01F 7/00291* (2013.01);
(Continued)

(58) Field of Classification Search
CPC .................................................. A47J 43/0716
(Continued)

(56) References Cited

U.S. PATENT DOCUMENTS

| 609,322 A | * | 8/1898 | Aichele | ............... B01F 7/00208 366/311 |
| 839,714 A | * | 12/1906 | Blanchat | ................... B01F 7/00 366/281 |

(Continued)

FOREIGN PATENT DOCUMENTS

| DE | 100 48 535 A1 | 2/2002 |
| FR | 2 859 617 A1 | 3/2005 |
| WO | 02/13622 A2 | 2/2002 |

OTHER PUBLICATIONS

International Search Report of PCT/EP2016/050535, dated Apr. 8, 2016.
(Continued)

*Primary Examiner* — David L Sorkin
(74) *Attorney, Agent, or Firm* — Collard & Roe, P.C.

(57) ABSTRACT

A mixing vessel for a food processor operated by an electric motor, which mixing vessel has a mixing mechanism which can be connected to a rotary drive of the food processor by means of a coupling driver, wherein the mixing vessel has a cleaning device for cleaning an inner wall of the mixing vessel, in particular a floor of the vessel. The cleaning device is arranged on the mixing vessel, in particular on a vessel wall and/or the mixing mechanism, and has at least one cleaning element which is designed such that, upon actuation of the cleaning device, it sweeps over the inner wall and/or over sub-regions of the mixing mechanism and, by interacting mechanically with any deposits which may be located on the inner wall and/or the mixing mechanism, helps to remove the same. The mixing vessel can have a cleaning device which has an ultrasonic transmitter, which is arranged in a fixed position in a wall of the mixing vessel or which is arranged, in particular in a removable manner, in the interior of the mixing vessel.

8 Claims, 6 Drawing Sheets

(51) Int. Cl.
*B01F 7/00* (2006.01)
*B01F 7/16* (2006.01)

(52) U.S. Cl.
CPC ........ *B01F 7/162* (2013.01); *B01F 15/00538* (2013.01); *B01F 2215/0014* (2013.01)

(58) Field of Classification Search
USPC .................................................. 366/309–313
See application file for complete search history.

(56) References Cited

U.S. PATENT DOCUMENTS

| | | | | |
|---|---|---|---|---|
| 864,631 | A | * | 8/1907 | Fegley ................ B01F 7/00208 366/311 |
| 969,016 | A | * | 8/1910 | Willnnann .......... B01F 7/00208 366/311 |
| 3,145,017 | A | * | 8/1964 | Thomas ................... A23G 9/16 366/310 |
| 4,790,667 | A | * | 12/1988 | Pardo ................ B01F 7/00166 366/311 |
| 5,421,651 | A | * | 6/1995 | Pickering ............ B01F 7/00208 366/311 |
| 7,044,051 | B2 | | 5/2006 | Le Rouzic |
| 2009/0064867 | A1 | | 3/2009 | Peng |
| 2012/0091245 | A1 | | 4/2012 | Menashes |

OTHER PUBLICATIONS

Letter to European Patent Office dated Jun. 23, 2016 with English translation of the relevant parts.

\* cited by examiner

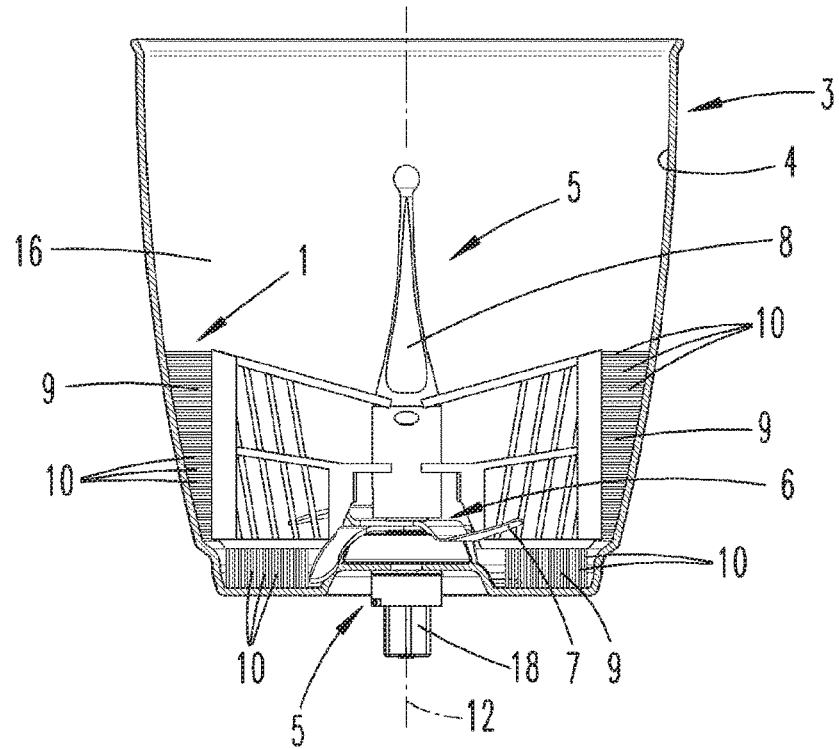
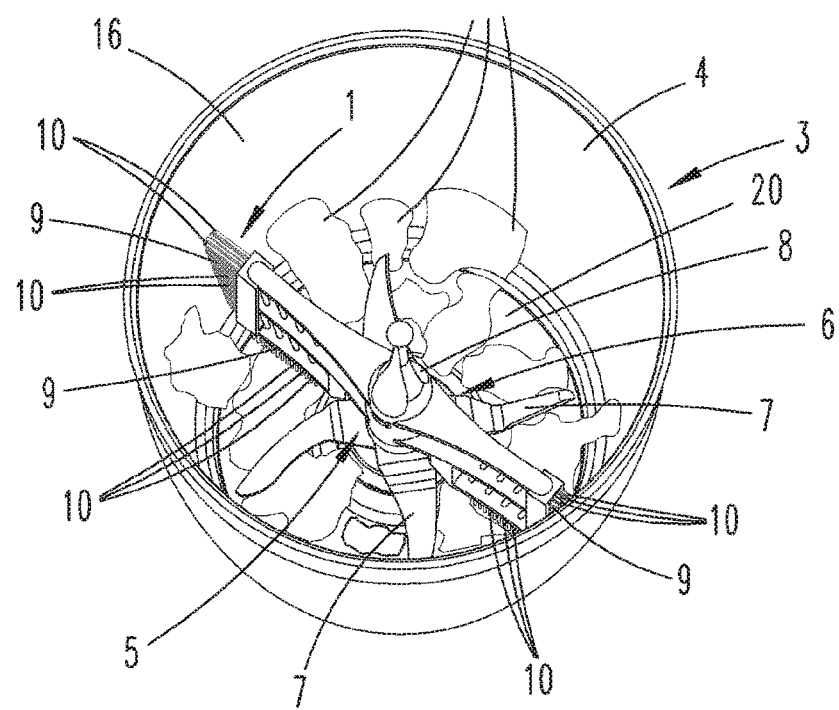

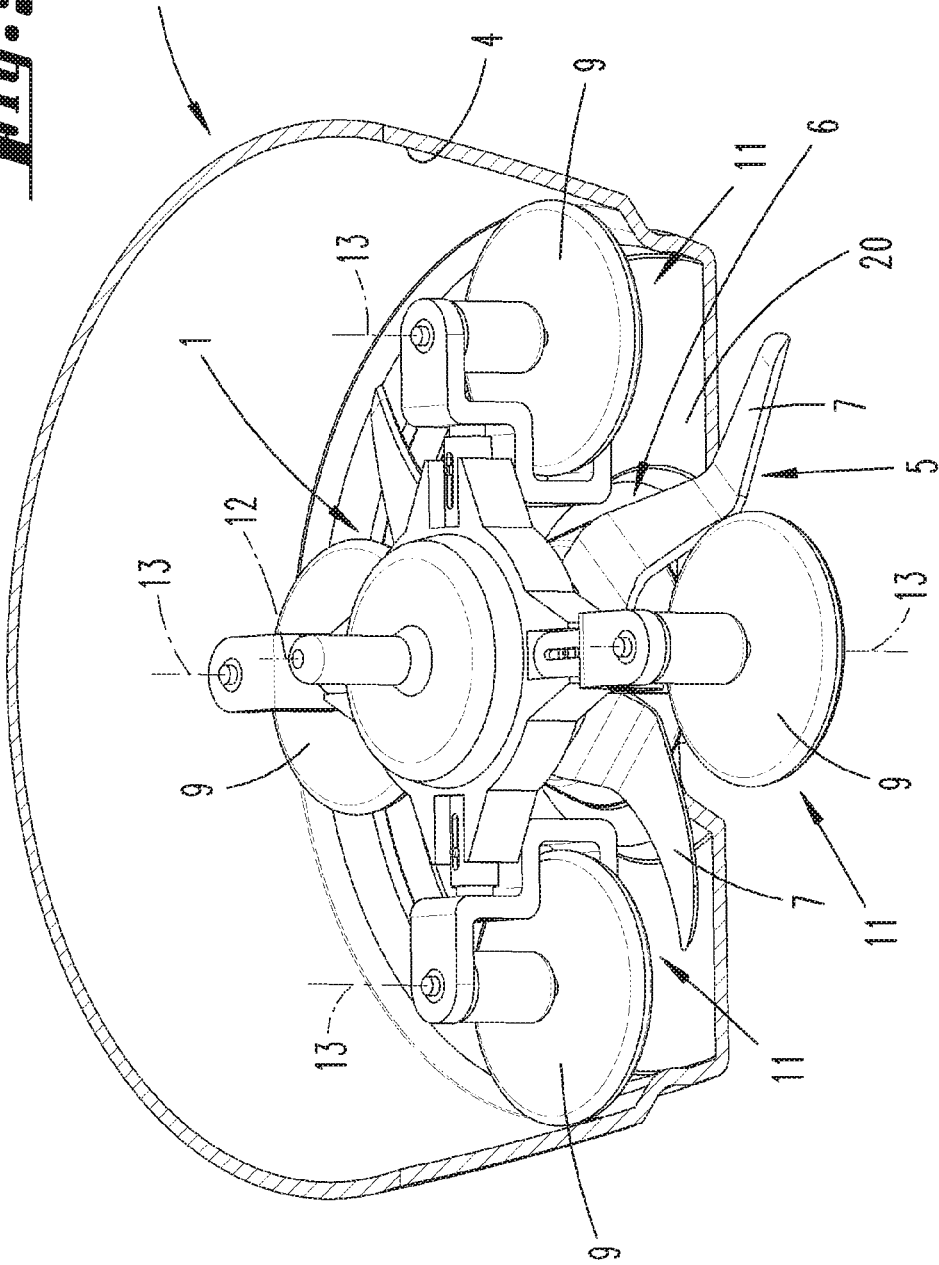

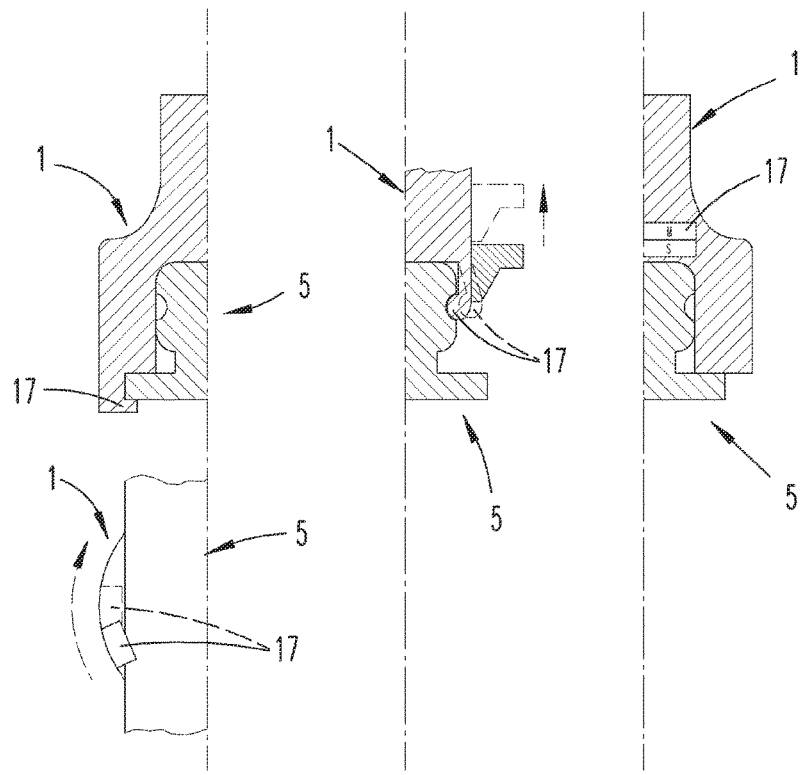

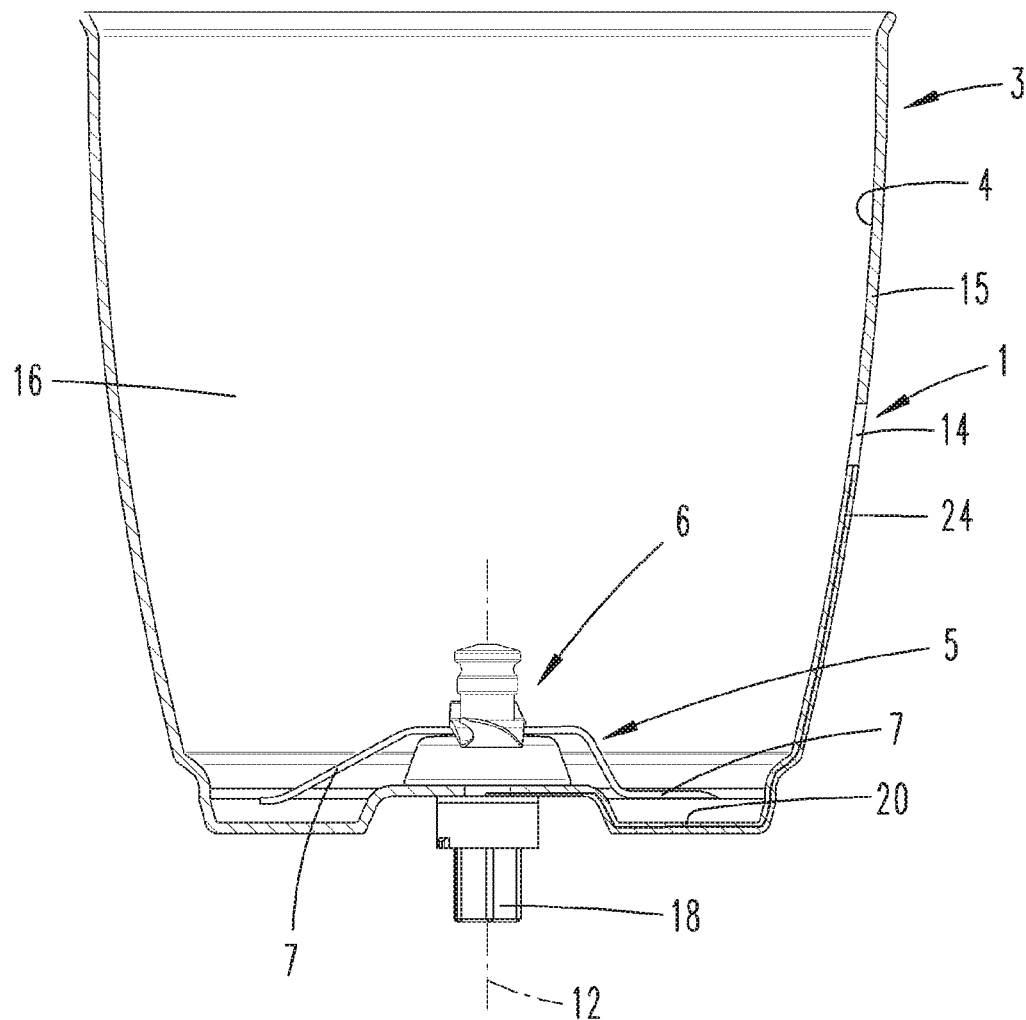

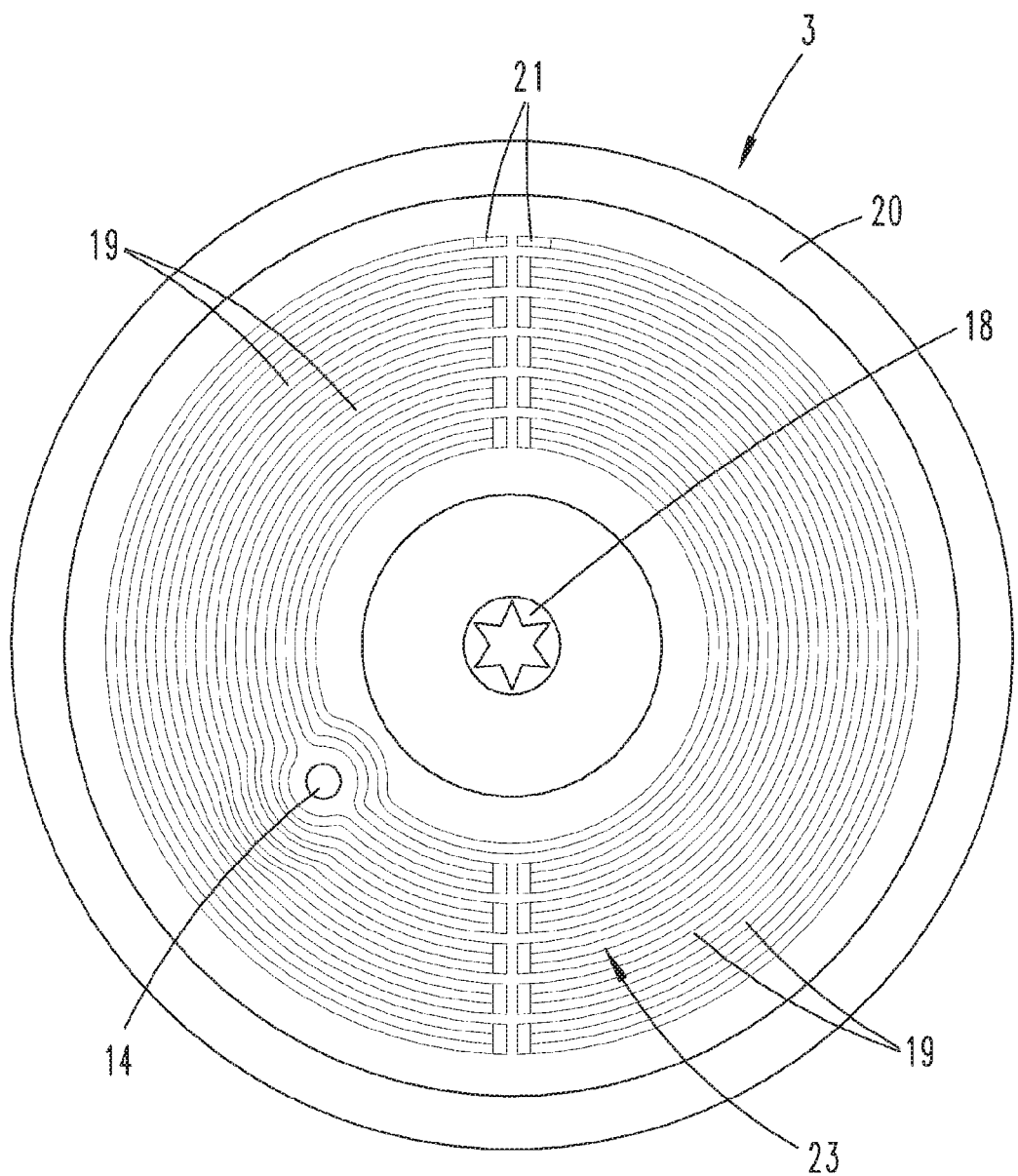

MIXING VESSEL FOR A FOOD PROCESSOR

CROSS REFERENCE TO RELATED APPLICATIONS

This application is the National Stage of PCT/EP2016/050535 filed on Jan. 13, 2016, which claims priority under 35 U.S.C. § 119 of German Application No. 10 2015 101 250.2 filed on Jan. 28, 2015, the disclosures of which are incorporated by reference. The international application under PCT article 21(2) was not published in English.

The invention concerns a mixing vessel for an electromotively driven food processor, which mixing vessel has a mixing mechanism, in particular a knife set or a milk foaming attachment, which by means of a coupling driver can be connected with the rotary drive of the food processor, whereby the mixing vessel has a cleaning device for purposes of cleaning an inner wall of the mixing vessel, in particular, a vessel floor.

In the prior art there exist various cleaning devices for purposes of cleaning a mixing vessel. The cleaning devices all serve to remove deposits adhering to the inner wall after the preparation of food within the mixing vessel. For example, manual cleaning devices such as bristles, sponges, steel wool, and similar are of known art, with the aid of which the inner wall of the mixing vessel can be cleaned by a force exerted by a user.

In addition, it is of known art to clean a mixing vessel of an electromotively operated kitchen machine by setting in motion water inside the mixing vessel by means of the mixing mechanism on which a knife set is advantageously arranged, whereby the moving water (a rotating cone of water) removes deposits from the inner wall of the mixing vessel.

Although the above-cited cleaning devices have proven to be useful in the prior art, these sometimes, depending on the type of deposits, require a long cleaning time, which is inconvenient for a user who is waiting to reuse the mixing vessel. In addition, the manual cleaning devices described are often difficult to use and are thus similarly inconvenient. In particular, there often exist certain regions within the mixing vessel (for example the floor) that cannot be reached and cleaned in an optimal manner, or indeed at all.

From US 2012/0091245 A1 a mixing vessel is of known art, which has a cleaning element, which upon actuation sweeps over the inner wall of the mixing vessel for purposes of removing deposits. From this starting point, the invention deals with the task of specifying a cleaning device that is as effective as possible.

This task is achieved by a mixing vessel having a cleaning element that, in addition to a rotation about an axis of rotation of the mixing mechanism, can rotate about an axis of rotation arranged in parallel to the first axis of rotation. In addition to the rotational movement about the axis of rotation of the mixing mechanism, the cleaning element can thus also perform a rotation about an axis of rotation parallel to the axis of rotation of the mixing mechanism, whereby the result is a superposition of the two rotational movements, which advantageously increases the cleaning intensity and cleaning homogeneity of the cleaning device. In particular, the cleaning element can rotate within an above-described partial circular segment, so that the cleaning effect is enhanced. In particular, provision can be made for each cleaning arm of a multi-armed design of cleaning device to be able to rotate independently of the other cleaning arms, such that a plurality of centres of rotation exist. For example, each of the individual cleaning arms can have a rotatably movable carrier element with cleaning elements, for example with bristles, on its end region pointing in the direction of the inner wall, whereby the carrier element is advantageously a circular plate with a toothed peripheral surface, which interacts with a corresponding toothed form on the inner wall in the manner of a geared drive. Alternatively, the carrier elements with rotational mobility can also be driven separately, independently of a rotation of the mixing mechanism, by means of an electric motor.

Provision can be made for the cleaning element in conjunction with the mixing mechanism to form planetary gearing, whereby at least a subregion of the mixing mechanism is designed to act as a sun gear and the cleaning element is designed to act as a planet gear. Advantageously, the cleaning element is arranged such that it contacts and thereby cleans both the inner wall of the mixing vessel and also subregions of the mixing mechanism. Needless to say, however, it is also possible to clean only one of the regions cited.

The cleaning device does not have to be manually held and moved by the user, but rather is arranged, that is to say, attached onto the mixing vessel. The cleaning device can be actuated such that this sweeps over parts of the inner wall and/or the mixing mechanism, and thereby removes the deposits. The actuation can in principle take place either in a motorised manner or manually, whereby a motorised actuation is advantageous in terms of user convenience. The actuation of the cleaning device takes place, for example, such that a motor arranged on the cleaning device moves, in particular, rotates, a cleaning element, or a plurality of cleaning elements, over the inner wall of the vessel wall. Here the motor is a part of the cleaning device.

Alternatively it is, however, also possible for a motor of the food processor, which is assigned to the rotary drive for the mixing mechanism, to be used for the actuation of the cleaning device.

It is proposed that the cleaning device be connectable with the mixing mechanism such that with a rotation of the rotary drive of the food processor the cleaning element is moved together with the latter. The cleaning device accordingly uses the rotary drive of the food processor such that a rotation of the mixing mechanism automatically also leads to a rotation of the cleaning device, that is to say, of the cleaning element, and thus effects a sweeping of the cleaning element along the surface to be cleaned.

The cleaning device can also be connected directly to a rotary shaft that usually serves to provide a connection to a mixing mechanism, in particular a knife set and/or a milk foaming attachment. Here the cleaning device is connected directly with the rotary shaft rather than with the mixing mechanism. This form of embodiment is particularly convenient since the user only has to replace the mixing mechanism with the cleaning device. Any other assembly measures are eliminated. Alternatively, however, the cleaning device can also—as explained earlier—be attached to the mixing mechanism that is already present, for example, a knife set, such that when the knife set rotates the cleaning device rotates with the latter. Similarly, in the case of a milk foaming attachment as a mixing mechanism, the milk foaming attachment is usually additionally attached to a knife set, such that the cleaning device rotates with the knife set and the milk foaming attachment.

By means of the above-cited designs, dirt is removed from the inner wall of the mixing vessel. In particular, dirt can also be removed where manual cleaning and/or cleaning by means of a rotating cone of water is particularly difficult or impossible within the mixing vessel, namely, in the floor region of the mixing vessel, which is regularly covered by a knife set or similar. In accordance with the invention, the cleaning device is designed such that the latter is in mechanical contact with the inner wall of the mixing vessel, at least in a subregion, in particular the floor surface, and thus acts exactly on the points to be cleaned.

In particular, the cleaning device can be arranged on the mixing mechanism or instead of a mixing mechanism, such that with a rotation of the mixing mechanism, or the rotary shaft, the cleaning device sweeps over the inner wall of the mixing vessel, in particular over the vessel floor, and/or also over subregions of the knife set.

The cleaning device advantageously has a central carrier element, for example, a plate or similar on which, for example, a plurality of cleaning elements are attached adjacent to one another in the circumferential direction. The carrier element can accommodate a multiplicity of cleaning elements and can be attached to the mixing mechanism, and/or knife set, and/or milk foaming attachment. In the installed state of the cleaning device in the mixing vessel the cleaning elements advantageously point in the direction of the inner wall of the mixing vessel, whereby contact exists between the cleaning elements and the inner wall.

The cleaning elements can have for example, bristles, textile fibres, metal fibres, and/or similar. Here it is essential that the cleaning elements achieve a cleaning effect on the inner wall of the mixing vessel that is to be cleaned. The bristles can take the form here, in particular, of metal bristles or natural bristles. In principle, all materials are suitable that are commonly used also in the cleaning of cooking utensils, in particular metal saucepans. These include, amongst others, also textile fibres, sponges, steel wool, etc.

It is proposed that the cleaning device has connecting elements for purposes of making a plug-in connection, a screw-in connection, a bayonet connection, a latch-in connection, and/or a magnetic connection with the mixing mechanism. In accordance with the invention, the cleaning device can thus have one or a plurality of connecting elements, which correspond with corresponding connecting elements of the mixing vessel. Here the connection can be a form fit connection, a force fit connection, a connection by means of magnetic force, or similar. In the case of a plug-in connection the cleaning device can have a subregion, into which, for example, a subregion of the mixing mechanism can be plugged. In the case of a screw-in connection a subregion of the cleaning device and a subregion of the mixing mechanism can have corresponding threads, which can be screwed together. In the case of a bayonet connection a subregion of the cleaning device can be clamped to a subregion of the mixing mechanism by means of a rotational movement. In the case of a latch-in connection a conventional undercut can be used, whereby a subregion of the cleaning device snaps under a corresponding subregion of the mixing mechanism. It is, of course, appropriate to make the connection reversible in these forms of embodiment, so that the user of the cleaning device can conveniently release it from the mixing mechanism once again. This can, for example, be ensured by means of a key, grip or similar, arranged on the cleaning device or the mixing mechanism. In the case of a magnetic connection the cleaning device can have a permanent magnet, which corresponds with a magnetic or magnetisable subregion of the mixing mechanism. In particular, a magnetic material such as, for example, magnetic, corrosion-resistant steel, is particularly suitable for this purpose, which at the same time is also suitable for the preparation of foodstuffs.

It is proposed that for purposes of mechanical interaction with the inner wall and/or the mixing mechanism, the cleaning element intervenes in a partial circular segment formed between knives of a knife set, or wings of a milk foaming attachment. In accordance with this form of embodiment, the cleaning element can, for example, have a central carrier element with a plurality of cleaning arms extending outwards from the latter, whereby the cleaning arms extend radially outwards relative to the axis of rotation of the mixing mechanism or the central carrier element. Since the carrier element is advantageously arranged centrally on the rotary shaft of the mixing mechanism, the individual cleaning arms of the cleaning device can be positioned between the knives of the knife set and/or adjacent wings of the milk foaming attachment, so that the end regions of the cleaning arms, on which the cleaning elements are advantageously arranged, intervene in these partial circular segments and there can perform a cleaning of the inner wall of the mixing vessel and/or of the mixing mechanism. In the case of a conventional knife set, which has, for example, four knives, each having an angular distance of 90° from one another, a cleaning arm can protrude into each of the quarter circular segments, which are formed between adjacent knives, and effect cleaning there.

Provision can be made for the cleaning element in conjunction with the mixing mechanism to form planetary gearing, whereby at least a subregion of the mixing mechanism is designed to act as a sun gear and the cleaning element is designed to act as a planet gear. Advantageously, the cleaning element is arranged such that it contacts and thereby cleans both the inner wall of the mixing vessel and also subregions of the mixing mechanism. Needless to say, however, it is also possible to clean only one of the regions cited.

The cleaning device can have an ultrasonic transmitter, which is arranged in a fixed location in a vessel wall of the mixing vessel, or which is arranged in the interior of the mixing vessel, in particular such that it can be removed. In addition, the mixing vessel can also have a mechanically acting cleaning device as described above.

The cleaning device has an ultrasonic transmitter that transmits vibrations to the vessel wall of the mixing vessel, and thus brings about an improved cleaning of the inner wall compared with the prior art. Here the cleaning action of ultrasound is utilised, whereby the ultrasonic transmitter transmits the vibrational energy either directly to the vessel wall (in the case of an arrangement of the ultrasonic transmitter within the vessel wall), or indirectly via a medium arranged in the mixing vessel, such as water, for example, (when the ultrasonic transmitter is arranged in the interior of the mixing vessel). If so desired, the cleaning result can also, if required, be aided by a cleaning agent, for example surfactants. In practice, it has been found that in this manner optimum self-cleaning of the mixing vessel can be achieved.

The ultrasonic transmitter can advantageously be integrated into a heating device arranged in the vessel wall, in particular in a vessel floor. In particular, the ultrasonic transmitter, combined with the heating device, can be welded into the vessel wall.

The ultrasonic transmitter is provided in addition to a mechanical cleaning attachment as previously described. For optimal cleaning of the inner wall of the mixing vessel an ultrasound frequency of between 10 and 100 kHz, in particular of between 20 and 50 kHz, is recommended. The electrical power consumption is advantageously between 20 W and 200 W, in particular approximately 100 W.

In addition to the cleaning device acting mechanically and, if required, by means of ultrasound, glass and/or metal balls can also be introduced into the mixing vessel; these also make contact with the inner wall of the mixing vessel and impinge mechanically on the deposits adhering to the inner wall.

Finally, the inventive mixing vessel, with the cleaning device having an ultrasonic transmitter, is also suitable for the preparation of foodstuffs. In particular, the inventive mixing vessel is suitable for the preparation of milk foam, in particular in conjunction with a rotating milk foaming attachment within the mixing vessel and also, if required, with the operation of a heating device for the mixing vessel. The ultrasonic irradiation of the milk contained in the mixing vessel reduces the surface tension of the fat molecules, such that they can be mixed better with air and/or water vapour with the result that foaming occurs.

Finally, in addition to the inventive mixing vessel, an electromotively operated food processor is also proposed, which has such a mixing vessel with a cleaning device as described above.

In what follows the invention is elucidated in more detail in terms of examples of embodiment. Here:

FIG. 3 shows a mixing vessel with a cleaning device in accordance with a first form of embodiment in a cross-sectional view, FIG. 4 shows the mixing vessel as in FIG. 3 in a perspective plan view, FIG. 5 shows a mixing vessel with a cleaning device in accordance with a second form of embodiment in a perspective plan view, FIGS. 6a)-c) show various forms of embodiment of connecting elements for purposes of connecting a cleaning device with a mixing mechanism, FIG. 7 shows a mixing vessel with a cleaning device in accordance with a third form of embodiment in a cross-sectional view, and FIG. 8 shows a vessel floor of a mixing vessel with a combination of a cleaning device and a heating device.

Figure 1:
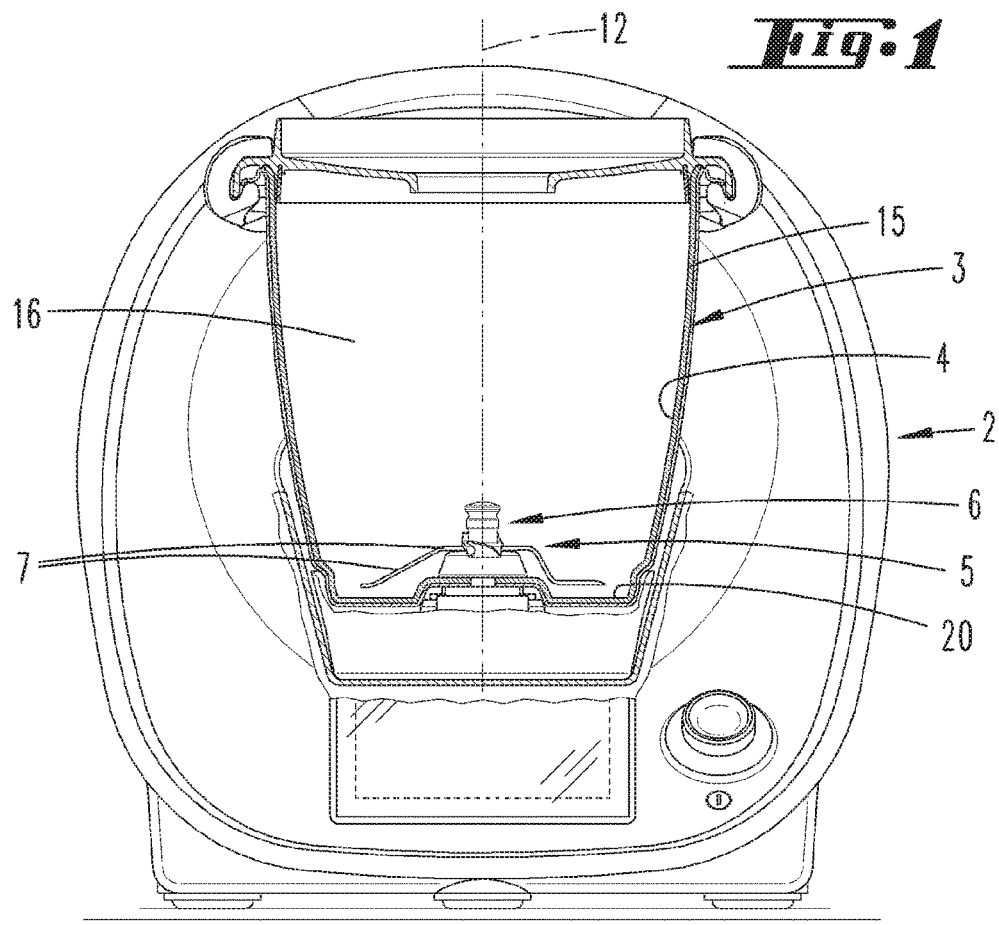
FIG. 1 shows a food processor with a mixing vessel in a cross-sectional view.

FIG. 1 shows an electromotively driven food processor 2, which here, for example, is designed as a cooking-mixing unit. A mixing vessel 3 is inserted into the food processor 2; this has a vessel wall 15 with an inner wall 4, including a vessel floor 20, which bounds an interior 16 of the mixing vessel 3.

A mixing mechanism 5, here in the form of a knife set 6, is arranged within the mixing vessel 3. The mixing mechanism 5 is arranged on a rotary shaft (not shown) having an axis of rotation 12, which at its end is connected by means of a coupling driver (18, see FIG. 3) with a rotary drive of the food processor 2. Here the knife set 6 has, for example, two knives 7, which cross in the vicinity of the axis of rotation 12, and are displaced relative to one another by an angle of 90°. The knives 7 each have two opposite end sections, extending in opposite directions in the form of a crescent, and have cutting edges on the concave side.

Figure 2:
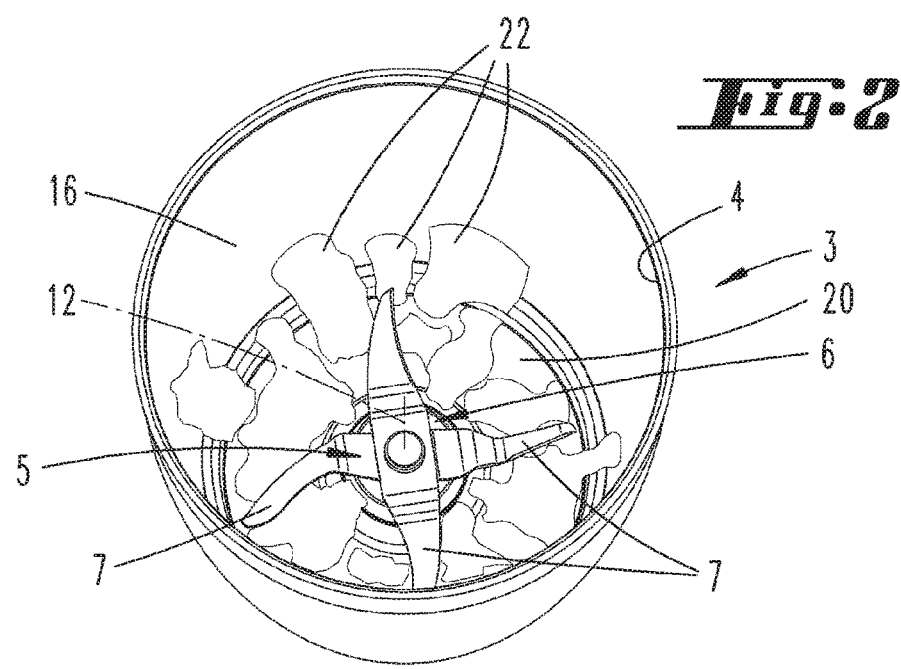
FIG. 2 shows a perspective plan view onto a mixing vessel.

FIG. 2 shows a plan view onto a mixing vessel 3, which after preparation of food has deposits 22 on the inner wall 4 of the mixing vessel 3, in particular on the vessel floor 20. The deposits 22 are residual foodstuffs from the dishes prepared in the mixing vessel 3, which adhere to the inner wall 4. Typically the residual foodstuffs can adhere to the inner wall, 4 or are burnt on to the latter. Various types of deposits 22 are conceivable, for example, residual foodstuffs of milk, cream, flour and water, chocolate, peanut butter, sugar, coffee, oil, pudding, food colouring, tomato sauce, or similar. The deposits 22 can form a continuous layer on the inner wall 4 or—as shown—can consist of individual fragments.

FIG. 3 shows a mixing vessel 3 with a cleaning device 1, which is connected with the mixing mechanism 5. Here the mixing mechanism 5 has a milk foaming attachment 8, commonly used for the foaming of milk, which is also known as a so-called butterfly insert. In addition, the mixing mechanism 5 has a knife set 6, on which is arranged the milk foaming attachment 8. The cleaning device 1 has a plurality of cleaning elements 9, here four; in turn each of these has a multiplicity of bristles 10 arranged next to one another. Two of the cleaning elements 9 are arranged on the milk foaming attachment 8, pointing radially outwards with respect to the axis of rotation 12, while, in the case of a conventional orientation of the milk foaming attachment 8, two further cleaning elements 9 are arranged within the mixing vessel 3 under the milk foaming attachment 8, such that the bristles 10 point in the direction of the vessel floor 20. The cleaning device 1 can, for example, be attached to the milk foaming attachment 8 by means of a latch-in connection, a plug-in connection, or similar. It is both possible to arrange the cleaning device 1 as a part on the milk foaming attachment 8, or to arrange each cleaning element 9 of the cleaning device 1 separately, whereby the first-cited variant is more convenient for the user because of the smaller number of handgrips required. The bristles 10 of the cleaning device 1 are, for example, steel bristles that contact the inner wall 4 of the stirrer vessel 3 in the installed state of the milk foaming attachment 8 and the cleaning device 1, at least with one end region. By virtue of the fact that the cleaning device 1 is connected to the mixing mechanism 5 of the food processor 2, the cleaning elements 9 of the cleaning device 1 are automatically moved together with the rotary drive of the food processor 2 when the mixing mechanism 5 is rotated, whereby the bristles 10 sweep over the inner wall 4 of the mixing vessel 3 and cause a release of the deposits 22 by mechanical interaction with the deposits 22 located on the inner wall 4.

FIG. 4 shows the mixing vessel as in FIG. 3 in a perspective view from above. The mixing mechanism 5 can be seen, which has the knife set 6, and the milk foaming attachment 8 arranged above the latter. The two cleaning elements 9 of the cleaning device 1 arranged underneath the milk foaming attachment 8 intervene in partial circular segments 11 formed between knives 7 of the knife set 6, such that the bristles 10 of the cleaning elements 9 come into contact with the vessel floor 20, and when the mixing mechanism 5 rotates these effect a removal of the deposits 22.

FIG. 5 shows a further variant of embodiment of the invention, in accordance with which the cleaning device 1 is designed in the manner of planetary gearing. The cleaning device 1 is arranged on the mixing mechanism 5, in this case the knife set 6, whereby the cleaning device 1 has four plate-form cleaning elements 9; these intervene in partial circular segments 11 formed between knives 7 of the knife set 6. The cleaning device 1 has an essentially rotationally symmetrical base arranged on the mixing mechanism 5, that is to say, on the axis of rotation 12; four cleaning arms are formed on the base, and these carry the plate-form cleaning elements 9. Each of the cleaning elements 9 is arranged on a cleaning arm such that it can rotate about an axis of rotation 13. The axes of rotation of the cleaning elements acting as planet gears run parallel to the axis of rotation 12 of the mixing mechanism 5. In the radial direction the plate-form cleaning elements 9 are in active connection with the inner wall 4 of the mixing vessel 3 such that the cleaning elements 9 roll on the inner wall 4 during rotation of the mixing mechanism 5 and thereby rotate around both the axis of rotation 12 and also the axis of rotation 13. The cleaning elements 9 can again have bristles 10 (not shown) that make contact with the vessel floor 20. In addition, however, it is also possible for the plate-form cleaning elements 9 to impinge directly on the vessel floor 20 in the manner of a grinding wheel. Depending on the size of the cleaning elements 9 and the partial circular segments 11 formed between the knives 7, the cleaning elements 9 can also impinge mechanically on the knives 7 as they rotate about the axis of rotation 13 and can free them from any deposits 22 that may be present.

Although this is not shown in the figure, the cleaning device 1 can, of course, also have one, two, three, or more than four cleaning elements 9, instead of four cleaning elements 9. In addition, it is also possible not to roll the plate-form cleaning elements 9 on the inner wall 4 for a rotation about the axes of rotation 13, but rather to rotate them by means of a separate motor of the cleaning device 1. This variant is also suitable, in particular, for cleaning devices 1, which are not connected to the mixing mechanism 5 in a rotationally fixed manner, and thus do not rotate together with a rotation of the mixing mechanism 5. By fitting the cleaning device 1 with its own motor, the rotation of the cleaning elements 9 about both the axis of rotation 12 and also the axis of rotation 13 can be effected.

FIGS. 6a to 6c show various options for attaching the cleaning device 1 to the mixing mechanism 5. The mixing mechanism 5 can, for example, be a knife set 6. FIG. 6a shows a bayonet connection in which a connecting element 17 of the cleaning device 1 engages under a corresponding subregion of the mixing mechanism 5. FIG. 6b shows a latch-in connection in which a flexible connecting element of the cleaning device 1 engages in a corresponding subregion of a mixing mechanism 5, here designed as a recess. FIG. 6c shows a magnetic connection of cleaning device 1 and mixing mechanism 5, in which the cleaning device 1 has a connecting element 17 designed as a permanent magnet, which interacts with a magnetic or magnetisable subregion of the mixing mechanism 5. Advantageously, the mixing mechanism 5 has a magnetic material in at least one subregion, such as, for example, magnetic, corrosion-resistant steel, which at the same time is also suitable for the preparation of foodstuffs.

FIG. 7 shows a mixing vessel 3 in accordance with a further form of embodiment of the invention, in which the cleaning device 1 has an ultrasonic transmitter 14, which is arranged in a fixed location in the vessel wall 15 of the mixing vessel 3. The ultrasonic transmitter 14 has an electrical connection 24 that connects the ultrasonic transmitter, via the coupling driver 18 of the mixing mechanism 5, to the power supply of the food processor 2. During operation of the cleaning device 1, the ultrasonic transmitter generates vibrations that are transmitted to the vessel wall 15 of the mixing vessel 3, and in this manner can effect the removal of deposits 22. Here the cleaning action of ultrasound is utilised, whereby the ultrasonic transmitter transmits the vibrational energy either wholly and directly to the vessel wall 15, or also indirectly via a medium arranged in the mixing vessel 3, such as water. If required, the cleaning result can also be aided by a cleaning agent, for example surfactants. Although this is not shown in the figure, the mixing vessel 3 in addition to the ultrasonic transmitter can, of course, also have a mechanically acting cleaning device 1.

FIG. 8 shows a vessel floor 20 of a mixing vessel 3, which has a combination of its heating device 23 and a cleaning device 1. A multiplicity of conducting tracks 19 with electrical contact pairs 21, which form the heating device 23, are arranged in the vessel floor 20. Furthermore, an ultrasonic transmitter 14, which generates vibrations and can transmit these to the vessel floor 20, or to the entire mixing vessel 3, is arranged between the conducting tracks 19. Particularly advantageously the heating-cleaning combination can be welded into the vessel floor 20.

LIST OF REFERENCE SYMBOLS

1 Cleaning device
2 Food processor
3 Mixing vessel
4 Inner wall
5 Mixing mechanism
6 Knife set
7 Knife
8 Milk foaming attachment
9 Cleaning element
10 Bristles
11 Partial circular segment
12 Axis of rotation
13 Axis of rotation
14 Ultrasonic transmitter
15 Vessel wall
16 Interior
17 Connecting element
18 Coupling driver
19 Conducting track
20 Vessel floor
21 Contact pair
22 Deposits
23 Heating device
24 Electrical connection

The invention claimed is:

1. A mixing vessel (3) for an electromotively driven food processor (2), which mixing vessel (3) has a mixing mechanism in the form of a knife set (6) or a milk foaming attachment (8), which by means of a coupling driver (18) can be connected with the rotary drive of the food processor (2), wherein the mixing vessel (3) has a cleaning device (1) configured for purposes of cleaning a vessel floor (20) of the mixing vessel (3), the vessel floor (20) being arranged transversely to a longitudinal direction of an axis of rotation (12) of the mixing mechanism, wherein further, the cleaning device (1) is arranged on the mixing mechanism (5), and has at least one cleaning element (9) that is designed such that the cleaning element is swept over the vessel floor by an actuation of the cleaning device (1), and, by a mechanical interaction with any deposits (22) that may be located on the vessel floor and/or the mixing mechanism (5), helps to remove them, wherein, the cleaning element (9), in addition to a rotation about the axis of rotation (12) of the mixing mechanism (5), can rotate about a second axis of rotation (13) arranged in parallel to the first axis of rotation (12), wherein the cleaning element (9) in conjunction with the mixing mechanism (5) forms planetary gearing, wherein at least a subregion of the mixing mechanism (5) is designed to act as a sun gear, and wherein the cleaning element (9) is designed to act as a planet gear, wherein the cleaning element (9) is a plate-form cleaning element (9) and is in active connection with the inner wall (4) of the mixing vessel (3) such that the cleaning element (9) rolls on the inner wall (4) during rotation of the mixing mechanism (5) and thereby rotates around both the first axis of rotation (12) and the second axis of rotation (13).

2. The mixing vessel (3) in accordance with claim 1, wherein, the cleaning device (1) is connected with the mixing mechanism (5) such that with a rotation of the rotary drive of the food processor (2) the cleaning element (9) is moved together with the mixing mechanism.

3. The mixing vessel (3) in accordance with claim 2, wherein, the cleaning device (1) has connecting elements (17) configured for making a plug-in connection, a screw-in connection, a bayonet connection, a latch-in connection, and/or a magnetic connection with the mixing mechanism (5).

4. The mixing vessel (3) in accordance with claim 1, wherein, the cleaning element (9) has bristles (10), textile fibres, and/or metal fibres.

5. The mixing vessel (3) in accordance with claim 1, wherein, for purposes of mechanical interaction with the vessel floor and/or the mixing mechanism (5), the cleaning element (9) intervenes in a partial circular segment (11) formed between knives (7) of the knife set (6), or wings of the milk foaming attachment (8).

6. The mixing vessel (3) in accordance with claim 1, wherein, further comprising an ultrasonic transmitter (14), which is arranged in a fixed location in a vessel wall (15) of the mixing vessel (3), or which is arranged in the interior (16) of the mixing vessel (3), such that the ultrasonic transmitter (14) can be removed.

7. The mixing vessel (3) in accordance with claim 6, wherein, the ultrasonic transmitter (14) is integrated into a heating device (23) arranged in the vessel floor (20).

8. An electromotively driven food processor (2) with a mixing vessel (3), which is designed in accordance with claim 1.

* * * * *